Patented May 12, 1925.

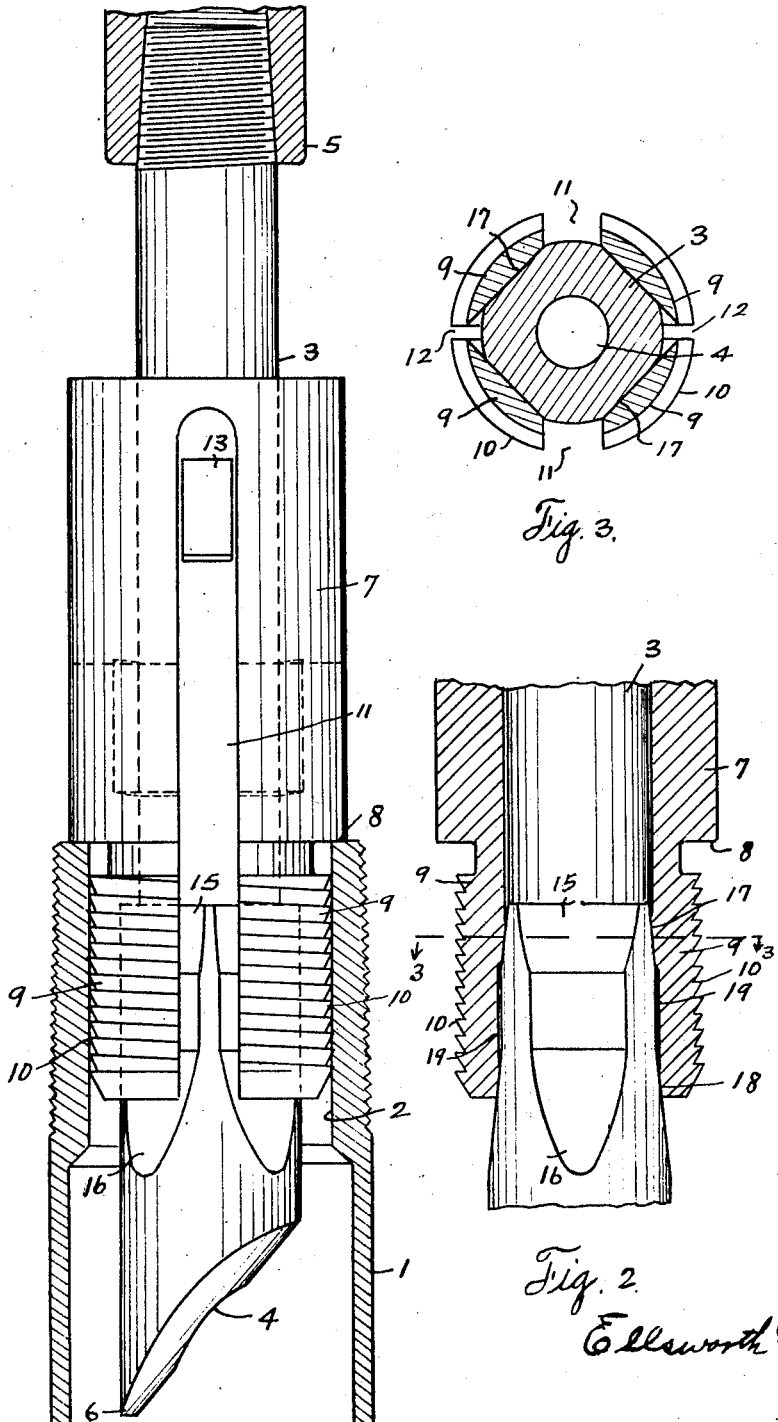

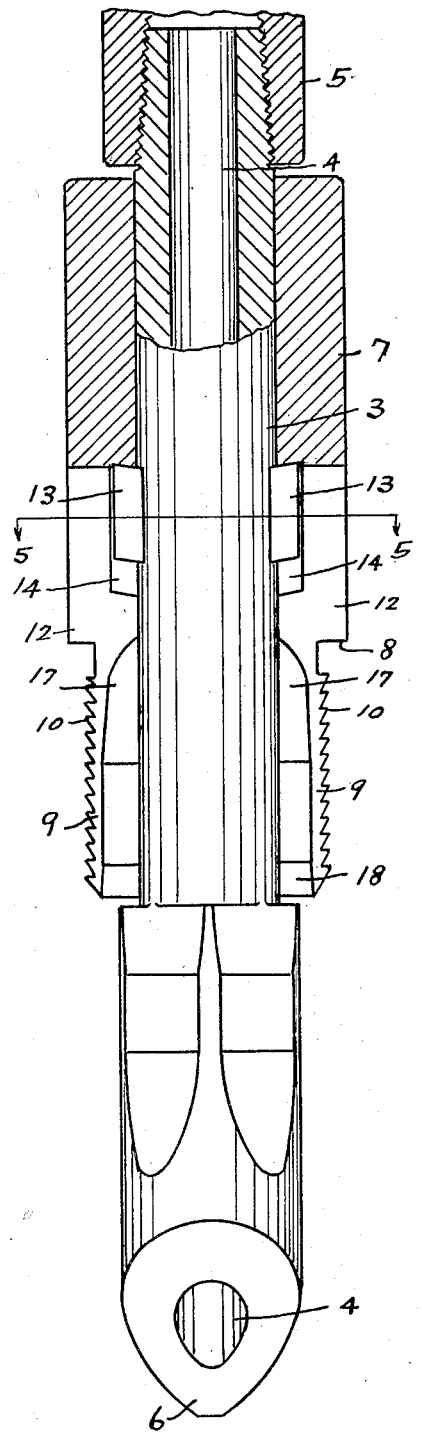

1,537,165

UNITED STATES PATENT OFFICE.

ELLSWORTH GRAY, OF HOUSTON, TEXAS.

PIPE PULLER.

Application filed September 15, 1923. Serial No. 662,951.

*To all whom it may concern:*

Be it known that I, ELLSWORTH GRAY, a citizen of the United States, residing at Houston, in the county of Harris and State of Texas, have invented certain new and useful Improvements in a Pipe Puller, of which the following is a specification.

This invention relates to new and useful improvements in a pipe puller.

One object of the invention is to provide a device of the character described specially adapted to be inserted into the upper end of, upset pipe and which may be engaged with said end, thereby forming means through which the string of pipe, stuck in a well bore may be withdrawn.

Another object of the invention is to provide a pipe puller which may be utilized to unscrew the joints of the stuck pipe, if the same cannot be pulled as a whole, and withdraw the same in joints, or sections.

A further feature resides in the provision of a pipe puller, which can be detached from the stuck pipe and withdrawn from the bore, if said pipe is so tightly stuck that it cannot be recovered.

With the above and other objects in view, the invention has particular relation to certain novel features of construction, operation and arrangement of parts, an example of which is given in this specification, and illustrated in the accompanying drawings, wherein:—

Figure 1 shows a side view of the device in engagement with the pipe to be pulled.

Figure 2 shows a fragmentary sectional view thereof.

Figure 3 shows a cross sectional view taken on the line 3—3 of Figure 2.

Figure 4 shows a side elevation, partly in section, of the device in disengaged position; and, Figure 5 shows a cross sectional view thereof taken on the line 5—5 of Figure 4.

In the drawings the numeral 1 designates the pipe to be pulled, whose upper end is upset, or inwardly thickened, as at 2. The numeral 3 designates a tubular mandrel, having the central water course 4. The device is let down into the bore by means of a suitable stem, as 5, which is attached to the upper end of the mandrel. The upper end of the stuck pipe usually lies over against one side, or wall, of the bore, and the lower end of the mandrel is beveled one way, forming a point 6 at one side, so that as the tool is lowered and slowly rotated, this point will more readily find and enter the upper end of the pipe sought to be pulled.

The lower end of the mandrel is slightly flared as shown, and there is a sleeve 7 slidable on the mandrel and formed with an external annular shoulder 8, adapted to rest upon the upper end of the pipe 1 when the device is in engagement with the pipe to be pulled. The lower end of this sleeve is reduced beneath said shoulder so as to enter the upset upper end of said pipe 1, and is slotted lengthwise, thus forming the pipe engaging jaws 9. The jaws have peripheral pipe engaging teeth 10, which are slightly inclined or screw shaped. If the threads connecting the joints of the stem 5, and connecting said stem to the mandrel 3, are right hand threads, the teeth 10 should have a left hand spiral, and vice versa. There will be, preferably four jaws 9, although more or less may be provided. The oppositely disposed slots 11, 11, are relatively wide and extend from the lower end of the jaws well up toward the upper end of the sleeve, and the other slots 12 are somewhat shorter and narrower. This slotted construction permits a sufficient expansion and contraction of the jaws to permit their engagement with, and disengagement from the pipe to be pulled.

When the device is lowered into the bore, the mandrel and the jaws will enter the upper end of the pipe 1 and the shoulder 8 will seat upon the upper end of said pipe. The mandrel has the integral lugs 13 which work in the slots 11 during this operation. An upward pull on the stem 5 will cause the flared lower end of the mandrel to wedge between the jaws and expand them into secure engagement with the pipe to be pulled, and a further upward pull will, in many cases, result in the dislodgment of the stuck pipe and it may then be withdrawn to the ground surface.

If the stuck pipe cannot thus be dislodged, the stem may be rotated and the stuck pipe unscrewed in joints, or sections, and thus withdrawn. If the joints of stuck pipe are connected by left hand threads a stem whose joints are connected with right hand threads should be used, and vice versa.

If the stuck pipe cannot be pulled, or if its joints cannot be unscrewed it will then be necessary to release the puller from said pipe and withdraw said puller. In order to accomplish this, the stem 5 is lowered to carry the flared portion of the mandrel 3, beneath the jaws 9, so as to permit them to contract. When so lowered, the lugs 13 will be carried into alignment with the oppositely disposed arcuate, inside grooves 14, 14, cut in the sleeve 7, and whose inner ends terminate at the shoulders 15, 15. The stem and mandrel are now turned to carry said lugs 13 around in said grooves 14, and against the shoulders 15. The friction of the jaws 9 against the pipe 1 will hold the sleeve 7 stationary during this turning movement. The device can now usually be detached from the stuck pipe by a direct pull, or if this cannot be accomplished, by rotating the stem in an appropriate direction, the jaws, by reason of the spiral of their teeth 10, may be unscrewed from the stuck pipe, and thus released.

It is to be noted that the flared portion of the mandrel, in the preferred form shown, is substantially square in cross section, and the inner sides of the jaws are formed with flat faces to conform thereto. This construction will cause the sleeve 7 to rotate with the mandrel and will relieve the lugs 13 of part of the strain. Furthermore, the flat inner faces of the jaws have a continuous bearing on the corresponding flat faces of the mandrel. If the flared portion of the mandrel were round and the cross sectional contour of the jaws arcuate, as is the case with most spears, now in common use, when said flared portion wedges up between said jaws to engage them with the pipe to be pulled, the jaws being on the arc of a smaller circle than the periphery of the portion of the mandrel contacting with the jaws, the edges only of said jaws would contact against the mandrel, having the central portions of the jaws unsupported, and when subjected to a hard pull the jaws would be split or crushed. It is further to be noted that the squared section of the mandrel may be stepped or formed with two flat faces, as 15 and 16, on each side, and the inner sides of the jaws are correspondingly formed as at 17 and 18, so that the jaws will be held spaced from the mandrel between said contacting faces, and as shown at 19, Figure 2. This construction will lessen the amount of friction surface between the mandrel and jaws, and this will lessen the liability of the mandrel sticking when wedged between said jaws, and will make it easier to release the mandrel when it is desired to detach the puller from the stuck pipe.

What I claim is:

1. A pipe puller including a mandrel whose lower end is flared, a slidable sleeve thereon, having vertical slots and inside grooves extending at substantially right angles to said slots, lugs projecting from the mandrel and working in said slots and grooves, expansible pipe engaging means depending from said sleeve.

2. A pipe puller including a mandrel whose lower end is flared, a slidable sleeve thereon, having vertical slots and inside grooves extending at substantially right angles to said slots, lugs projecting from the mandrel and working in said slots and grooves, expansible pipe engaging means depending from said sleeve, and formed with external spiralled pipe engaging teeth.

3. A pipe puller including a mandrel whose lower end is flared, a slidable sleeve thereon, having vertical slots and inside grooves extending at substantially right angles to said slots, lugs projecting from the mandrel and working in said slots and grooves, expansible pipe engaging means depending from said sleeve, and formed with external spiralled pipe engaging teeth, and an external projection carried by said sleeve.

4. A pipe puller including a mandrel whose lower end is flared and formed with flat external faces, a slidable sleeve thereon, depending pipe engaging jaws, carried by said sleeve whose inner surfaces are formed with flat faces adapted to ride on the corresponding faces of the mandrel, said sleeve having vertical slots, and inside grooves extending at substantially right angles to said slots, and lugs carried by the mandrel, and adapted to work in said slots and grooves.

5. A pipe puller including a mandrel whose lower end is formed with flared sections spaced apart and arranged in stepped relation, a slidable sleeve mounted on the mandrel, expansible pipe engaging means carried by the lower end of the sleeve whose inner wall is formed with stepped bearing faces adapted to simultaneously bear against the corresponding flared sections of the mandrel.

6. A pipe puller including a mandrel whose lower end is formed with flared sections spaced apart and arranged in stepped relation, a slidable sleeve mounted on the mandrel, expansible pipe engaging means carried by the lower end of the sleeve whose inner wall is formed with stepped bearing faces adapted to simultaneously bear against the corresponding flared sections of the mandrel, said means having external spiralled, pipe engaging teeth.

7. A pipe puller including a mandrel whose lower end is formed with flared sections spaced apart and arranged in stepped relation, a slidable sleeve mounted on the mandrel, expansible pipe engaging means carried by the lower end of the sleeve whose inner wall is formed with stepped bearing faces adapted to simultaneously bear against the corresponding flared sections of the mandrel, and an external projection carried by the sleeve and adapted to seat on the upper end of the pipe to be pulled.

8. A pipe puller including a mandrel whose lower end is formed with flared sections spaced apart and arranged in stepped relation, a slidable sleeve mounted on the mandrel, expansible pipe engaging means carried by the lower end of the sleeve whose inner wall is formed with stepped bearing faces adapted to simultaneously bear against the corresponding flared sections of the mandrel, said sleeve having vertical side slots and inside grooves extending at substantially right angles to the slots, and lugs carried by the mandrel and adapted to work in said slots and grooves.

In testimony whereof I have signed my name to this specification.

ELLSWORTH GRAY.

Witness:
E. V. HARDWAY.